United States Patent [19]

Miller

[11] Patent Number: 4,530,276
[45] Date of Patent: Jul. 23, 1985

[54] CONTACT TOASTER

[75] Inventor: Dye O. Miller, South Barrington, Ill.

[73] Assignee: A. J. Antunes & Co., Addison, Ill.

[21] Appl. No.: 116,081

[22] Filed: Jan. 28, 1980

[51] Int. Cl.³ .............................................. A47J 37/08
[52] U.S. Cl. ........................................ 99/386; 99/349;
99/393; 99/423; 99/443 C; 198/628
[58] Field of Search .......................... 99/386, 390–393,
99/399, 443 C, 367, 369, 377, 379, 397, 402,
385, 374, 388, 389, 349, 351, 427, 423, 443;
198/628

[56] References Cited

U.S. PATENT DOCUMENTS

| 1,297,848 | 3/1919 | Hill | 99/386 |
|---|---|---|---|
| 1,440,643 | 1/1923 | Strite | 99/386 |
| 1,708,522 | 4/1929 | Pross, Jr. | 99/386 X |
| 2,588,851 | 3/1952 | Kompass | 99/386 |
| 2,847,931 | 8/1958 | Saint | 99/389 |
| 2,917,990 | 12/1959 | Ehrenberg | 99/386 |
| 3,528,361 | 9/1970 | Le Van | 99/386 X |
| 3,587,446 | 6/1971 | Gardner | 99/443 R |
| 3,611,913 | 10/1971 | McGinley | 99/386 X |
| 3,697,725 | 10/1972 | Bielefeldt | 99/443 C |
| 3,718,819 | 2/1973 | Miksitz | 198/628 X |
| 3,739,712 | 6/1973 | Duning | 99/386 X |
| 3,987,718 | 10/1976 | Lang-Ree et al. | 99/423 X |
| 4,189,631 | 2/1980 | Baker | 99/386 |
| 4,261,257 | 4/1981 | Henderson et al. | 99/386 |

FOREIGN PATENT DOCUMENTS 314741 7/1929 United Kingdom ................. 99/374

Primary Examiner—Billy J. Wilhite
Attorney, Agent, or Firm—McDermott, Will & Emery

[57] ABSTRACT

A contact toaster includes a housing with an inlet and outlet and a toasting chamber defined therebetween. A platen capable of being heated is removably positioned within the toasting chamber and between a pair of conveyors intended to convey a product to be toasted across the heated platen. The distance between the conveyors and the platen may be adjusted by abutment members rotatably mounted about an axis within the housing. The abutment members include a plurality of sides each of which is spaced a different distance from the axis thereby providing a variety of different distances between each conveyor and the platen.

8 Claims, 7 Drawing Figures

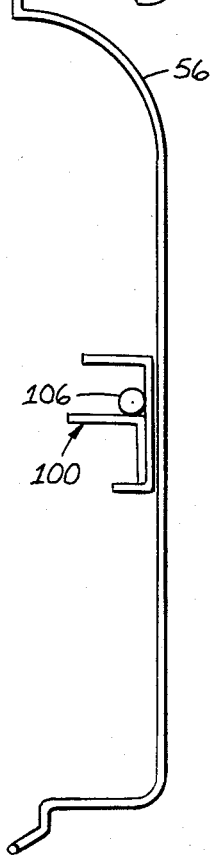
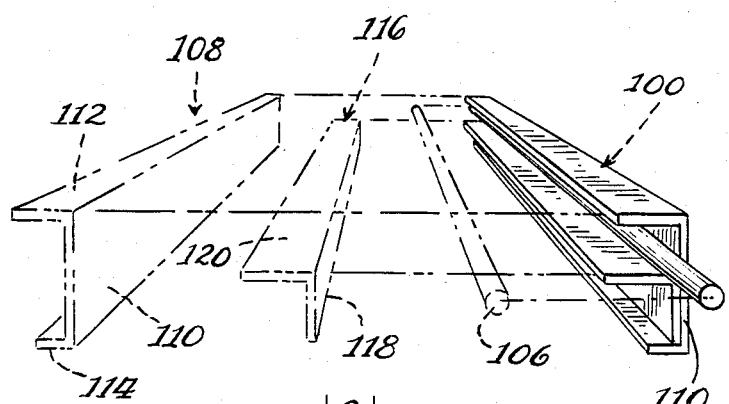
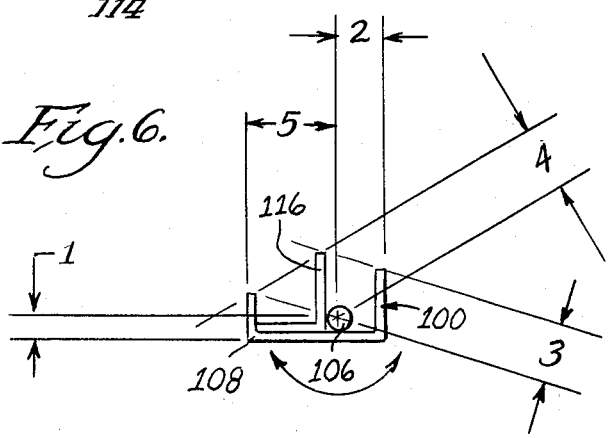
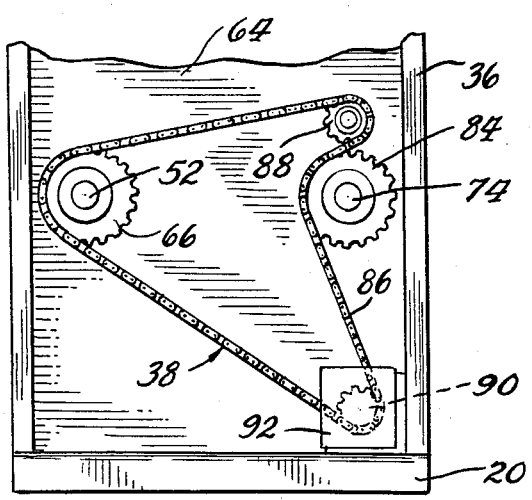

4,530,276

CONTACT TOASTER

BACKGROUND OF THE INVENTION

A. Field of the Invention

The present invention relates to a new and improved device for toasting items such as buns and the like.

B. Description of the Prior Art

In many large commercial institutions that serve products with buns and the like that are to be toasted it is desirable to toast a large number of these buns in a short period of time. A typical bun includes a crown portion and a heel portion that are of unequal dimensions. For example, the crown portion is usually of a greater thickness than the heel portion. Accordingly, the toasting apparatus must be capable of accepting both the crown and the heel portions but in addition, must be able to ensure that the open side of both the crown and the heel portion are firmly pressed against a heated platen of the toaster in order to attain complete and even toasting.

It is important that complete and even toasting is accomplished since the toasting of the open face of the heel and crown portions results in a carmelizing effect that not only provides a toasted appearance and taste but also effectively seals the open faces thereby preventing seepage of the juices from the meat placed on the buns and other ingredients such as ketchup and mustard into the body of the heel and crown portions. It is further desirable that an equal number of crown and heel portions can be inserted into the toaster at the same time so as to prevent unequal number of toasted portions available to be served to the customer. It is also desirable that a large number of heel and crown portions be toasted in a relative short period of time. Due to the large number of buns toasted by these toasters, it is also desirable that the platen can be removed to allow periodic cleaning.

Typical prior art toasters may be of the type such as illustrated in U.S. Pat. No. 3,517,605 wherein a stepped platen or other structure is included in the toaster so that a crown and heel portion of a bun may be inserted into the toasting apparatus side by side. Another example of the prior art toasting device is illustrated in the U.S. Pat. No. 3,620,156 wherein the platen is fixed within the toaster and the conveying system and the surface against which the heel or crown portions engage is movable relative to the platen to adjust for the size of the portion of the bun being toasted. These prior art structures, however, require careful and slow insertion of the heel and crown portions of the buns into the toaster thereby reducing the speed at which the buns are toasted and also leaving a substantial margin for error in the distance between the platen and conveyor that results in incomplete toasting of the bun and thus an unacceptable product to sell. Accordingly, it is desirable to overcome these disadvantages among others.

SUMMARY OF THE INVENTION

An object of the present invention is to provide a new and improved device for toasting buns.

Another object of the present invention is to provide a new and improved device for simultaneously toasting the heel and crown portions of buns and the like with the capability of adjusting the space between a conveyor and heating platen to accept the different sized portions uniformly.

Another object of the present invention is to provide a new and improved toaster for toasting products that includes a heated platen that may be easily removed, cleaned and reinserted into the toaster.

The present invention is directed to a new and improved toaster for toasting buns and the like that includes a housing with an inlet and outlet and a chamber defined therebetween. A heated platen is positioned within the chamber between the inlet and outlet and defines two separate toasting chambers. The toaster also includes first and second conveyors mounted on opposite sides of the platen for conveying the buns to be toasted along the length of the platen.

The spacing of the conveyors from the platen is adjustable through the employment of conveyor abutment members that are rotatably mounted within the housing each of which includes multiple sides of varying distances from an axis of rotation so as to provide a plurality of sides of different distances to engage the conveyors.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 4 is an enlarged view of a conveyor adjustment mechanism of the toaster of the present invention;

FIG. 5 is an exploded view of an adjustment member included in the mechanism illustrated in FIG. 4;

FIG. 6 is a schematic view illustrating various positions of the adjustment member illustrated in FIG. 5; and FIG. 7 is a partial view of the drive mechanism for the conveyors of the toaster of the present invention.

DESCRIPTION OF THE PREFERRED EMBODIMENT

Figure 1:
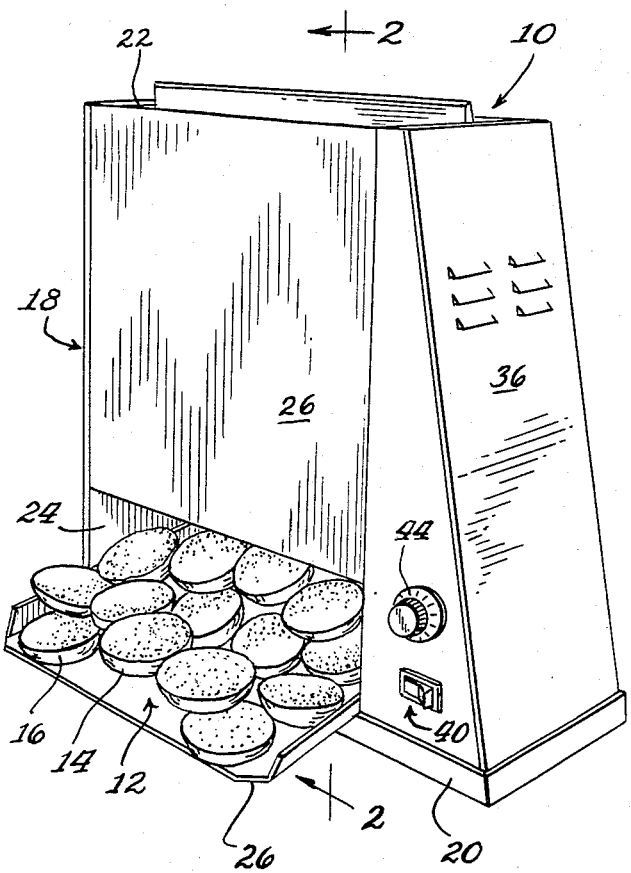
FIG. 1 is a perspective view of a toaster constructed in accordance with the principles of the present invention.

Referring now to the drawings and initially to FIG. 1 there is illustrated a contact toaster generally designated by the reference numeral 10 constructed in accordance with the principles of the present invention. The contact toaster 10 may be employed to toast food products and is particularly adapted, in the preferred embodiment illustrated, to toast buns 12 of the type including crown portions 14 and heel portions 16 wherein the crown portions 14 are typically of a greater larger thickness than the heel portion 16.

The toaster 10 is intended to toast the open face of the crown 14 and heel 16 portions to produce a carmelizing of each open face to inhibit seepage of juices through the carmelized or toasted layer into the crown 14 and heel 16 portions. It is also the purpose of the toaster 10 to toast buns 12 rapidly and efficiently.

The toaster 10 includes a housing generally designated by the reference numeral 18 that is vertically mounted on a base 20 and includes an inlet 22 into which the products to be toasted such as buns 12 are inserted and an outlet 24 within which is positioned a tray or ramp 26 upon which the toasted buns 12 accumulate after the toasting process. The housing 18 is generally divided into two components or sections. The first section 26 of housing 18 defines an internal toasting chamber 28 composed of two sub-chambers 30 and 32 within which a conveyor assembly generally designated by the reference numeral 34 is located to convey the buns 12 from the inlet 22 to the outlet 24. The housing 18 also includes a second housing section 36 that houses a conveyor drive assembly generally designated by the reference numeral 38 (FIG. 7).

Mounted on the face of the second section 36 is an on-off switch 40 that energizes the conveying system 38 of the toaster 10 and heats a platen 42 positioned within the toasting chamber 28. The platen 42 serves to toast the open faces of the crown 14 and heel 16 portions of the buns 12. Switch 40 may be transparent and include an internal light that is energized upon actuation of the switch 40 thereby indicating to the operator that the toaster 10 is energized. A temperature selection knob 44 is also mounted on the second housing section 36 and is of a type well known in the art that functions as a thermostat to control the temperature of the heated platen 42 that may include a surface control with heat resistant teflon thereby allowing the operator to select a wide range of temperatures to obtain the proper degree of toasting of the food product toasted by the toaster 10.

Toasting a food product such as the buns 12 is accomplished by conveying the open face of the crown 14 and heel 16 portions along the length of the heated platen 42 while it is heated to an elevated temperature thereby toasting or carmelizing the open faces. Once this is accomplished, the crown 14 and heel 16 portions are then conveyed to the outlet 24 and onto the ramp or tray 26 whereupon the toasted crown 14 and heel 16 portions slide to the mouth of the outlet 24.

To accomplish the conveying of buns 12, the conveyor system 34 is employed. The conveyor system 34 includes a first link belt 46 that is looped around first 48 and second 50 sprocket wheels mounted on axles 52 and 54, respectively, that are secured in the housing 18. The portion of link conveyor 46 adjacent the platen 42 is maintained in relative position by a guide 56 that is supported at its upper end by a first support 58 that is biased to a preferred position by springs 59. The first support 58 includes a slot at its upper end within which is positioned the upper end 60 of the guide 56. Slack in the link conveyor 46 is taken up by a resilient biasing member 62 mounted on the housing section 26 so as to engage and push against the link belt 46 biasing it toward the platen 42. In the second housing portion 36 (FIG. 7), a gear 66 is mounted on the shaft 52.

In a similar manner, a second conveyor link belt 68 is mounted within the chamber 32 and extends around sprocket wheels 70 and 72 that are mounted on axles 74 and 76, respectively. The link conveyor belt 68 extends around a guide 78 and is held at its upper end by a support 80 biased toward the platen 42 by a spring 81 similar to the support 58. In addition, the support 80 includes a slot at its upper end through which an upper end 82 of the guide 78 extends. The axle 74 extends through the wall 64 and has mounted thereon a gear 84 similar to the gear 66 (FIG. 7).

The link belts 46 and 68 are rotated by the sprocket wheels 48 and 70 that are themselves rotated by a chain 86 that extends around gears 66 and 84, an idler gear 88 and a motor gear 90 (FIG. 7). Gear 90 is mounted on a shaft of a motor 92 and is rotated by the motor 92 that is energized by the switch 40. Rotation of the gear 90 causes the sprocket wheels 48 and 70 to be rotated in the direction of the arrows 94 and 96 by the chain 86.

Figure 2:
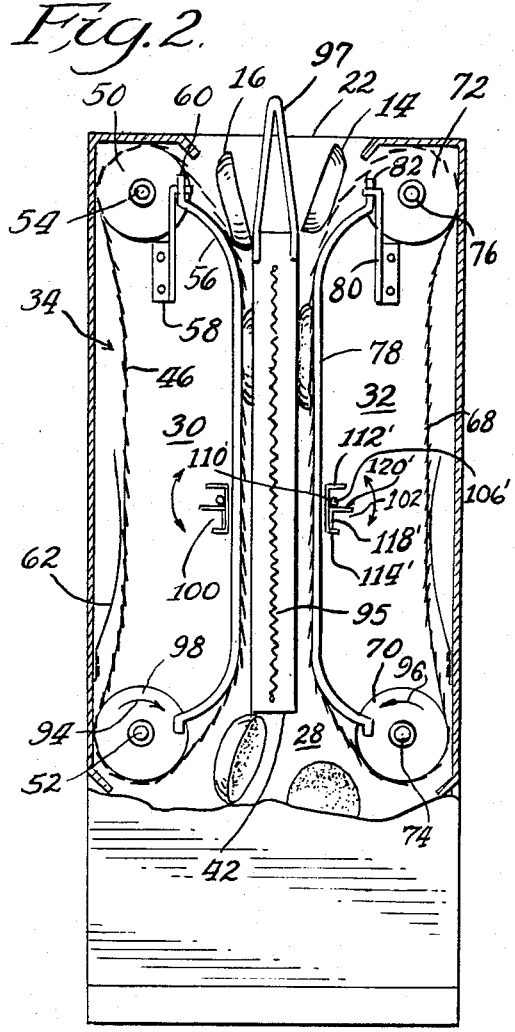
FIG. 2 is a view taken along line 2—2 of FIG. 1.

Thus, as best illustrated in FIG. 2, to toast a bun 12 a crown portion 14 and a heel portion 16 are inserted in the inlet 22 at opposite sides of the platen 42 so that the open face of each portion 14 and 16 is located against the platen 42 and conveyed therealong by the link belts 46 and 68 to be toasted. To accomplish the toasting, the platen 42 has imbedded therein cal rods or electrical resistance wires 95 that are electrically connected through the switch 40 and thermostat 42 to a source of electrical energy.

As illustrated in the preferred embodiment, the platen 42 is permanently mounted within the housing 18; however, it includes an upper unheated end 97 that is wedge shaped so as to allow a partially cut bun 12 to be placed thereon with the heel portion 16 on one side and the crown portion 14 on the other and as the bun 12 is pressed down on the end 97, the bun 12 is separated such that the crown 14 and heel portions 16 are placed on opposite sides of the platen 42.

It should be understood, however, that the platen 42 may include a plug well known in the art to allow removal of the platen 42 by grasping the upper end 97 and lifting upward. The platen 42 may then be cleaned and reinserted into the toasting chamber 28.

Since the crown portion 14 of each bun 12 is generally thicker than the heel portion 16, it is desirable that the space between the link conveyors 46 and 68 and the platen 42 be of two different distances. One distance being such that the heel portions 16 are firmly positioned against the heated platen 42 and the second distance so as to ensure that the open faces of the crown portions 14 are firmly pressed against the heated platen 42 to ensure complete toasting of both portions of the buns 12. The toaster 10 accomplishes this by adjusting the position of the supports 56 and 78 by adjustable supports or abutment members 100 and 102. Since the supports 100 and 102 are identical, the support 100 will be described and the corresponding component of the adjustable abutment member 102 will be designated by a prime adjacent the reference numeral.

The adjustable abutment member 100 is a frame mounted on a rod 106 extending between the wall 64 across the entire housing portion 26 and defining an axis of rotation of the member 100. The member 100 includes a back 108 (FIG. 6) with a flat surface 110 and perpendicularly extending legs 112 and 114 of unequal length.

Member 100 also includes a second component that is a right angle member 116 including first 118 and second 120 legs at right angles to each other.

The components 108 and 116 are secured together in the fashion illustrated in FIG. 5 and the entire support member 100 is secured to the rod 106 along its entire length. The abutment member 100 in this construction provides several different surfaces to engage the support 56 with each engagement surface being a different distance from the rod or axis 106 thereby providing a multiple selection of positions to vary the position of the support 56 relative to the platen 42.

For example with reference to FIG. 6, with the surface 110 engaging the support 56 as illustrated in FIG. 2, the distance indicated by the numeral 1 in FIG. 6 is provided between the surface 110 and the rod 106. If the frame 100 is rotated such that the surface defined by the side of leg 112 engages the support 56, the distance indicated by the reference numeral 2 in FIG. 6 is provided. This distance is slightly greater than the distance 1 thereby moving the support 56 closer to the platen 42 and reducing the distance therebetween.

Further rotation of the abutment member 100 results in engagement of the end of the legs 112 and 120 with the support member 56 providing the distance indicated by the numeral 3 in FIG. 6. This distance is greater than the distances indicated by reference numerals 1 and 2 thereby further lessening the distance between the support 56 and the platen 42.

The support member 100 may be further rotated so that the engagement of the support 56 is with the end of the legs 114 and 120 thereby providing the distance indicated by the reference numeral 4 in FIG. 6 which is greater than the distance indicated by the reference numerals 1, 2, and 3. Thereby further reducing the distance between the support 56 and the platen 42.

The variable abutment member 100 may be rotated an additional amount such that the surface defined by the end of the leg 114 engages the support 56 the distance between this surface and the rod 106 is indicated by the reference numeral 5 in FIG. 6 and is greater than the distances indicated by the reference numerals 1-4 thereby further reducing the distance between the support 56 and the platen 42.

Figure 3:
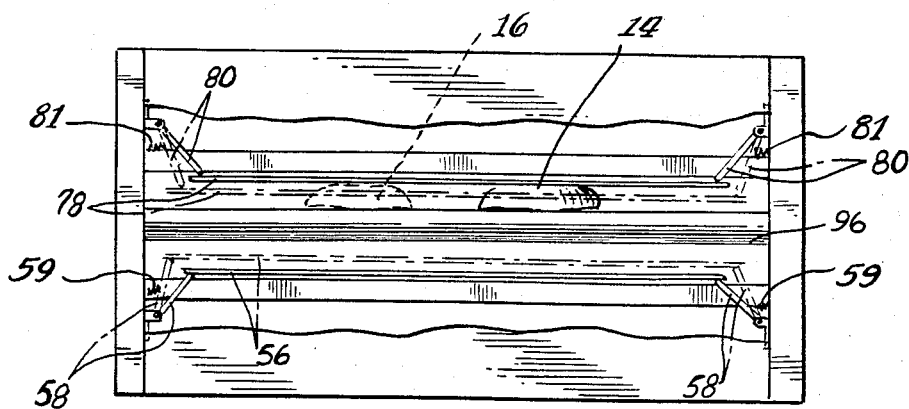
FIG. 3 is a partially cut away top plan view of the toaster of the present invention.

As can be understood either of the support members 100 and 102 may be rotated such that the distance between the support member 56 and the platen 42 may be different than the distance between the support member 78 and the platen 42. Different distances are preferred while toasting buns 12 since the thickness of the crown portions 14 is different than the thickness of the heel portions 16. In this manner both portions 14 and 16 of each bun 12 may be simultaneously toasted by the toaster 10 thereby speeding the toasting operation while at the same time insuring complete toasting of the open face of each portion. The difference in the distances between the support 78 and the platen 42, for example, is illustrated in FIG. 3 wherein in solid lines support 78 is illustrated at a distance sufficient to toast the crown portion 14 and in dotted lines the support 78 is illustrated in a position for toasting the heel portion 16.

Many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. An assembly for toasting food products comprising:
   a housing,
   a product inlet and product outlet defined in said housing,
   a chamber defined by said housing between said inlet and said outlet,
   a platen mounted in said housing dividing said chamber into first and second toasting chambers,
   means for conveying said food products through said first and second chambers along said platen, said conveying means including a pair of flexible endless belts, each of said belts located in a different one of said chambers, and means for rotating said belts to slide said food products along said platen between each of said belts and said platen, and
   means for selectively flexing the portions of said belts adjacent said platen to selectively adjust the position of the portions of the belts adjacent said platen with respect to said platen and with respect to the remainder of said conveyor in order to accomodate food products of different sizes, said flexing means including at least one multisided abutment member rotatably mounted in said housing in abutting relationship with said conveying means.

2. The assembly set forth in claim 1 wherein each said side of said abutment member is a different preselected distance from an axis of rotation of said abutment member.

3. The assembly set forth in claim 1 wherein said platen is removable from said housing.

4. The assembly set forth in claim 1 wherein said conveyors each includes at least one continuous link conveyor.

5. A toaster for toasting food products comprising:
   a housing defining a toasting chamber,
   said housing including an inlet and an outlet,
   a toasting platen mounted in said chamber,
   means for heating said platen,
   a pair of endless flexible conveyors for conveying said food products from said inlet, across two sides of said platen to said outlet, each of said conveyors including a flexible belt and means for rotating said belt, and
   means for selectively adjusting the position of the portion of said belts adjacent said platen with respect to said platen and with respect to the remainder of said conveyor, said adjusting means including an axial rod rotatably mounted in said housing, and a pair of multisided abutment members operatively connected to said rod and said adjusting means further including a guide means for guiding the advance of each of said belts along said platen, said members abutting said guide means and arranged to move said guide means with respect to said platen to thereby adjust the position of said belts with respect to said platen by flexing said belts.

6. The toaster claimed in claim 5 wherein each side of said abutment members is spaced a different distance from said rod.

7. The toaster claimed in claim 5 wherein said platen further comprises an end extending out of said inlet, said end being in the configuration of a wedge.

8. The toaster claimed in claim 5 wherein said platen is removably mounted in said chamber.

* * * * *